US012801856B2

(12) United States Patent
Cheng et al.

(10) Patent No.: US 12,801,856 B2
(45) Date of Patent: Nov. 17, 2026

(54) EVENT GROUNDING SYSTEM AND EVENT GROUNDING METHOD

(71) Applicant: The Hong Kong University of Science and Technology, Hong Kong (CN)

(72) Inventors: Jiayang Cheng, Hong Kong (CN); Yangqiu Song, Hong Kong (CN)

(73) Assignee: The Hong Kong University of Science and Technology, Hong Kong (CN)

( * ) Notice: Subject to any disclaimer, the term of this patent is extended or adjusted under 35 U.S.C. 154(b) by 175 days.

(21) Appl. No.: 18/811,791

(22) Filed: Aug. 22, 2024

(65) Prior Publication Data

US 2025/0117588 A1 Apr. 10, 2025

Related U.S. Application Data

(60) Provisional application No. 63/588,296, filed on Oct. 6, 2023.

(51) Int. Cl.
*G06F 40/30* (2020.01)
*G06F 40/205* (2020.01)
(Continued)

(52) U.S. Cl.
CPC ............ *G06F 40/30* (2020.01); *G06F 40/205* (2020.01); *G06F 40/253* (2020.01); *G06F 40/284* (2020.01); *G06N 5/04* (2013.01)

(58) Field of Classification Search
CPC ...... G06F 40/30; G06F 40/205; G06F 40/253; G06F 40/284; G06F 40/211; G06N 5/04; G06N 5/022
See application file for complete search history.

(56) References Cited

U.S. PATENT DOCUMENTS

| | | | | |
|---|---|---|---|---|
| 7,568,019 B1 * | 7/2009 | Bhargava | ............... | G06Q 10/06 709/224 |
| 10,019,437 B2 * | 7/2018 | Ho | .......................... | G06F 40/30 |

(Continued)

OTHER PUBLICATIONS

Peter West, Chandra Bhagavatula, Jack Hessel, Jena D. Hwang, Liwei Jiang, Ronan Le Bras, Ximing Lu, Sean Welleck, and Yejin Choi. 2021. Symbolic knowledge distillation: from general language models to commonsense models. In Proceedings of the 2022 Conference of the North American Chapter of the Association for Computational Linguistics: Human Language Technologies, pp. 4602-4625.

(Continued)

*Primary Examiner* — Abul K Azad
(74) *Attorney, Agent, or Firm* — IDEA Intellectual Limited; Sam T. Yip

(57) ABSTRACT

An AI-based event grounding system is provided. The event grounding system includes an input device, an output device, a graphic processing unit (GPU); and a processor. The processor connects the input device, the output device, and the GPU. The event grounding system receives a free-text through the input device, and the processor perform an event grounding to the free-text through the GPU. The GPU performs event acquisition from the free-text using semantic parsing and acquires a plurality of verb-centric events, and performs event abstraction and acquires a plurality of abstract events, and grounds the abstract events to a plurality of anchor events of an event-centric KG, and reasons a subgraph through a reasoning model, and the subgraph includes the abstract events and the anchor events. The GPU generates a prediction based on the reasoning and provide the prediction through the processor and the output device.

8 Claims, 6 Drawing Sheets

(51) Int. Cl.
*G06F 40/253* (2020.01)
*G06F 40/284* (2020.01)
*G06N 5/04* (2023.01)

(56) References Cited

U.S. PATENT DOCUMENTS

2009/0100053 A1* 4/2009 Boschee ............... G06F 16/334
2016/0042058 A1* 2/2016 Nguyen .................. G06F 40/30
707/771

OTHER PUBLICATIONS

Thomas Wolf, Lysandre Debut, Victor Sanh, Julien Chaumond, Clement Delangue, Anthony Moi, Pierric Cistac, Tim Rault, Remi Louf, Morgan Funtowicz, Joe Davison, Sam Shleifer, Patrick von Platen, Clara Ma, Yacine Jernite, Julien Plu, Canwen Xu, Teven Le Scao, Sylvain Gugger, Mariama Drame, Quentin Lhoest, and Alexander Rush. 2020. Transformers: State-of-the-art natural language processing. In Proceedings of the 2020 Conference on Empirical Methods in Natural Language Processing: System Demonstrations, pp. 38-45, Association for Computational.

Wenhan Xiong, Jingfei Du, William Yang Wang, and Veselin Stoyanov. 2020. Pretrained encyclopedia: Weakly supervised knowledge-pretrained language model. In 8th International Conference on Learning Representations, ICLR 2020, Addis Ababa, Ethiopia, Apr. 26-30, 2020. OpenReview.net.

Wenhan Xiong, Mo Yu, Shiyu Chang, Xiaoxiao Guo, and William Yang Wang. 2019. Improving question answering over incomplete KBs with knowledge-aware reader. In Proceedings of the 57th Annual Meeting of the Association for Computational Linguistics, pp. 4258-4264.

Keyulu Xu, Weihua Hu, Jure Leskovec, and Stefanie Jegelka. 2018. How powerful are graph neural networks? arXiv preprint arXiv:1810.00826.

Michihiro Yasunaga, Hongyu Ren, Antoine Bosselut, Percy Liang, and Jure Leskovec. 2021. QA-GNN: Reasoning with language models and knowledge graphs for question answering. In Proceedings of the 2021 Conference of the North American Chapter of the Association for Computational Linguistics: Human Language Technologies, pp. 535-546.

Changlong Yu, Hongming Zhang, Yangqiu Song, and Wilfred Ng. 2022. CoCoLM: Complex commonsense enhanced language model with discourse relations. arXiv preprint arXiv:2012.15643.

Xiaodong Yu, Wenpeng Yin, Nitish Gupta, and Dan Roth. 2021. Event linking: Grounding event mentions to wikipedia. arXiv preprint arXiv:2112.07888.

Hongming Zhang, Xin Liu, Haojie Pan, Haowen Ke, Jiefu Ou, Tianqing Fang, and Yangqiu Song. 2022. ASER: Towards large-scale commonsense knowledge acquisition via higher-order selectional preference over eventualities. Artificial Intelligence, 309, p. 103740.

Hongming Zhang, Xin Liu, Haojie Pan, Yangqiu Song, and Cane Wing-Ki Leung. 2020. ASER: A large-scale eventuality knowledge graph. In Proceedings of the Web Conference 2020, pp. 201-211.

Zhengyan Zhang, Xu Han, Zhiyuan Liu, Xin Jiang, Maosong Sun, and Qun Liu. 2019. ERNIE: enhanced language representation with informative entities. In Proceedings of the 57th Annual Meeting of the Association for Computational Linguistics, ACL 2019, Florence, Italy, Jul. 28-Aug. 2, 2019, pp. 1441-1451.

Ming Zhong, Yang Liu, Suyu Ge, Yuning Mao, Yizhu Jiao, Xingxing Zhang, Yichong Xu, Chenguang Zhu, Michael Zeng, and Jiawei Han. 2022. Unsupervised summarization with customized granularities. arXiv preprint arXiv:2201.12502.

Yucheng Zhou, Xiubo Geng, Tao Shen, Guodong Long, and Daxin Jiang. 2022. EventBERT: A pre-trained model for event correlation reasoning. In Proceedings of the ACM Web Conference 2022, pp. 850-859.

Yucheng Zhou, Xiubo Geng, Tao Shen, Jian Pei, Wenqiang Zhang, and Daxin Jiang. 2021. Modeling event-pair relations in external knowledge graphs for script reasoning. In Findings of the Association for Computational Linguistics: ACL-IJCNLP 2021, pp. 4586-4596.

Yucheng Zhou, Tao Shen, Xiubo Geng, Guodong Long, and Daxin Jiang. 2022. ClarET: Pre-training a correlation-aware context-to-event transformer for event-centric generation and classification. In Proceedings of the 60th Annual Meeting of the Association for Computational Linguistics (vol. 1: Long Papers), pp. 2559-2575.

* cited by examiner

EVENT GROUNDING SYSTEM AND EVENT GROUNDING METHOD

CROSS-REFERENCE TO RELATED APPLICATIONS

The present application claims priority from the U.S. Provisional Patent Application No. 63/588,296 filed Jun. 10, 2023, and the disclosure of which is incorporated herein by reference in its entirety.

FIELD OF THE INVENTION

The present invention generally relates to an artificial intelligence (AI)-based event grounding method. More specifically the present invention relates to a system utilizing an Knowledge Graph (KG) event grounding method.

BACKGROUND OF THE INVENTION

Reasoning on narratives is a fundamental task in natural language processing (NLP) and has attracted significant interest within the NLP community. It is crucial for downstream applications such as text summarization and dialogue generation.

The most critical challenge in narrative reasoning is modeling the relationship between events, which often requires extensive background world knowledge.

Consider the following story: "Tom was tired and wanted to have fun. He bought a movie ticket for Harry Potter." This narrative can be broken down into multiple sub-sentences:

(E1) Tom was tired.

(E2) Tom wanted to have fun.

(E3) He bought a movie ticket for Harry Potter.

Each sub-sentence represents an event with a verb and one or more arguments. These events convey most of the meaning within their contexts.

For human beings, understanding these semantic units heavily relies on background world knowledge beyond the immediate context. For instance, given E1 and E2, we might infer that Tom has just finished his work. Knowing that watching movies is enjoyable, it is reasonable to conclude that Tom chose this activity (from E2 to E3). We can also deduce from E3 that Tom would need to arrive at the theater before the movie starts.

To help machines leverage this type of event knowledge, existing solutions generally fall into two categories:

- Implicit Modeling with Language Models (LMs): Some approaches involve pretraining language models using event-aware objectives. While this method captures event knowledge, it often sacrifices transparency and explainability of reasoning. The knowledge is embedded in a way that is not easily interpretable.
- Explicit Modeling with Knowledge Graphs (KGs): Other approaches explicitly organize world knowledge of events into structured, event-centric knowledge graphs. These graphs provide a clear and organized representation of events and their relationships. Despite these methods, research on effectively leveraging symbolic event knowledge in these KGs for reasoning is limited. Existing work mainly deals with a restricted format (subject-verb-object) of texts and does not generalize well to free-texts.

Many large-scale knowledge graphs such as ATOMIC, ConceptNet, ASER, and GLUCOSE have been constructed in recent years. However, how to leverage the knowledge in these resources effectively remains a problem. Current solutions can be broadly categorized into two groups: the knowledge model paradigm and the retrieval-and-integration paradigm, referring to FIG. 6.

Knowledge Model Paradigm: This approach leverages external KGs by pretraining LMs with carefully designed objectives. Most existing knowledge-enhanced LMs focus on using entity-centric KGs. When it comes to utilizing external event knowledge, this paradigm involves finetuning LMs on event-aware KGs through methods like event-pair relation modeling, whole event recovering/masking, and correlation-based event ranking.

Retrieval-and-Integration Paradigm: In contrast, this approach explicitly retrieves triples or subgraphs from external KGs. Recent research on reasoning with external knowledge bases (KBs) and texts has explored grounding entities to KGs in tasks such as open-domain question answering (QA), commonsense QA, and narrative reasoning. However, most of these efforts focus on entity-centric KGs, which contain little or no event knowledge. While some studies on script reasoning have investigated the usage of events, their methods are typically restricted to "subject-verb-object"-like structured texts in the Machine Comprehension of Narrative Chains (MCNC) task, making it challenging to extend to general free-texts.

In comparison, our work addresses the more complex problem of grounding events in free-texts to event-centric KGs. Given the critical need for explainability in AI, our approach extends the retrieval-and-integration paradigm to achieve this goal. By doing so, we enhance narrative reasoning with a more explainable and effective framework for grounding free-texts to event-centric KGs.

SUMMARY OF THE INVENTION

To tackle the above problems, some embodiments of the present invention propose a novel AI-based framework called EvenGround to explicitly ground free-texts to event-centric knowledge graphs (KGs). Our approach addresses two main challenges: event representation and event sparsity.

Event Representation Problem: We employ a semantic parsing-based event extraction method enhanced with an event normalization module. This module separates events from their contexts while preserving coreference information, ensuring that references like pronouns remain correctly linked to their antecedents.

Event Sparsity Problem: Inspired by human abstract thinking, we introduce a multi-level event abstraction approach. This method conceptualizes events into various abstract levels by omitting detailed arguments. This abstraction helps in generalizing events, making it easier to match them to the incomplete nature of KGs.

In some embodiments of the present invention, we empirically demonstrate that our solutions significantly alleviate the sparsity problem.

Additionally, in some embodiments of the present invention, we ground the abstracted events to KGs to create joint reasoning subgraphs. We then use a graph neural network (GNN)-based model for reasoning.

Experimental results on three narrative reasoning tasks show that our framework in some embodiments of the present invention consistently outperforms current state-of-the-art models. Furthermore, we provide a qualitative study illustrating how our approach offers human-interpretable evidence for model predictions.

Contributions of the Invention

In some embodiments of the present invention, we present the initial formulation of the problem of grounding free-texts to event-centric KGs.

In some embodiments of the present invention, we introduce EvenGround, a systematic AI-based approach to solving the event representation and sparsity problems, enabling effective narrative reasoning based on grounded information.

Experimental results indicate that our approach of the embodiments outperforms strong baselines, achieving new state-of-the-art performance on three datasets while providing human-interpretable evidence.

In an aspect of some embodiments of the present invention, an AI-based event grounding method is provided. The event grounding method includes: event acquisition from an input free-text using semantic parsing through an event grounding system and acquiring a plurality of verb-centric events; event abstraction through the event grounding system and acquiring a plurality of abstract events; the event grounding system grounds the abstract events to a plurality of anchor events of an event-centric KG; reasoning a subgraph by the event grounding system through a reasoning model; and generate a prediction. The subgraph includes the abstract events and the anchor events.

In another aspect of some embodiments of the present invention, an AI-based event grounding system is provided. The event grounding system includes an input device, an output device, a graphic processing unit (GPU); and a processor. The processor connects the input device, the output device, and the GPU. The event grounding system receives a free-text through the input device, and the processor perform an event grounding to the free-text through the GPU. The GPU performs event acquisition from the free-text using semantic parsing and acquires a plurality of verb-centric events, and performs event abstraction and acquires a plurality of abstract events, and grounds the abstract events to a plurality of anchor events of an event-centric KG, and reasons a subgraph through a reasoning model, and the subgraph includes the abstract events and the anchor events. The GPU generates a prediction based on the reasoning and provide the prediction through the processor and the output device.

In an embodiment of the present invention, the event acquisition includes: event extraction, and event normalization.

In an embodiment of the present invention, the event acquisition includes: the event grounding system extracts the verb-centric events from the free-text. Every verb-centric event includes a trigger verb and a set of arguments, and each of the argument has a semantic role.

In an embodiment of the present invention, the event acquisition includes: the event grounding system replaces a plurality of first tokens in the verb-centric events with a plurality of second tokens. Every first token refers to a person. Every second token refers to one or more of the first tokens referring to the same person.

In an embodiment of the present invention, the event abstraction includes: the event grounding system dropping the arguments of each verb-centric event according to their importance; and acquire the abstract events.

In an embodiment of the present invention, the event grounding system grounds the abstract events to a plurality of nodes in the even-centric KG. The event grounding system acquires the anchor events from the nodes, and every abstract event is linked to one or a plurality of the anchor events.

In an embodiment of the present invention, the event grounding system acquire the subgraph, and the subgraph includes all the anchor events, the abstract events and the verb-centric events.

In an embodiment of the present invention, the event grounding system employs a GNN module to perform reasoning on the subgraph.

In an embodiment of the present invention, all the words in the events are lemmatized.

In an embodiment of the present invention, while processing the first and second tokens, a plurality of spans of words are detected by syntactic parsing and animacy classification, and the event grounding system employ the co-reference information between these spans to normalize all spans that refer to persons and generate the second tokens.

BRIEF DESCRIPTION OF DRAWINGS

Embodiments of the invention are described in more details hereinafter with reference to the drawings, in which.

DETAILED DESCRIPTION OF THE INVENTION

Figure 1:
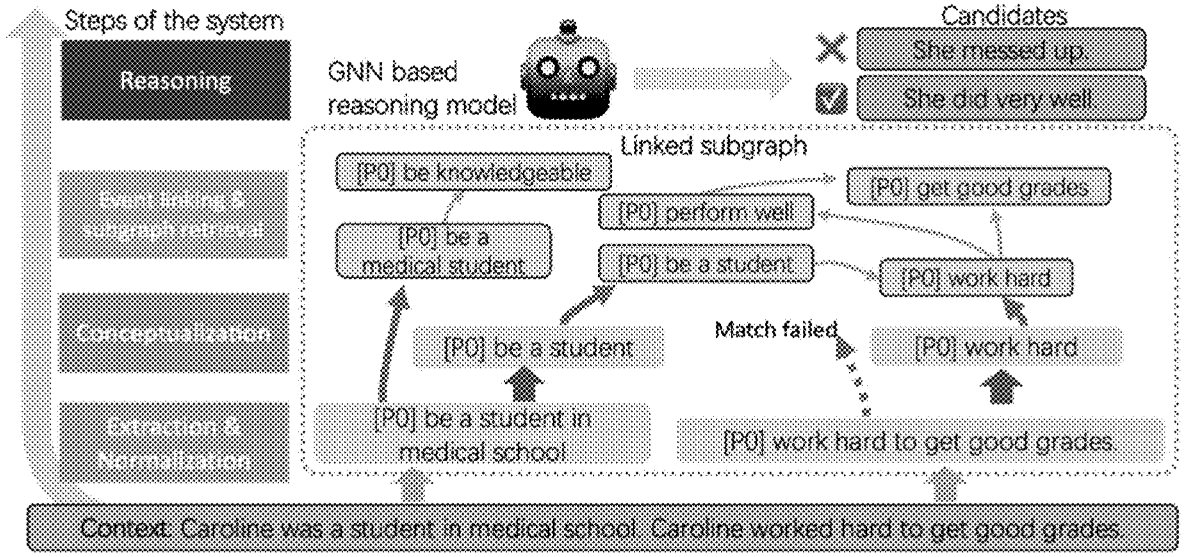
FIG. 1 is an overview of AI-based systematic system EvenGround of an embodiment of the present invention.

In the following description, AI-based method and system for event grounding and the likes are set forth as preferred examples. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

In some embodiments of the present invention, an AI-based event grounding system and an AI-based event grounding method are provided to tackle unsolved issues in grounding free-texts to event-centric KGs.

In some embodiments of the present invention, one of the primary target of the event grounding system and event grounding method of this invention includes the design of EvenGround. EvenGround provide a comprehensive framework for grounding free-texts to event-centric KGs to enhance contextualized narrative reasoning. This invention addresses critical challenges in the field of NLP, particularly in understanding and reasoning about narratives. The specific targets and features of this invention are as follows:

Enhanced Event Representation:

In some embodiments of the present invention, the system employs a semantic parsing-based event extraction method. This method is equipped with an event normalization module designed to separate events from their contexts while preserving co-reference information. This ensures that references such as pronouns remain correctly linked to their antecedents, which is crucial for accurate narrative understanding.

Alleviation of Event Sparsity:

Inspired by human abstract thinking processes, in some embodiments of the present invention, the system introduces a multi-level event abstraction approach. This method conceptualizes events into various abstract levels by omitting detailed arguments. This abstraction helps generalize events, making it easier to match them to the incomplete nature of KGs and significantly reduces the failure rate of event grounding.

Event Grounding and Joint Reasoning:

In some embodiments of the present invention, the abstracted events are grounded to KGs to create joint reasoning subgraphs. The system of the embodiments utilizes a GNN-based model to perform reasoning on these subgraphs. This combination of event abstraction and GNN-based reasoning enhances the system's ability to interpret and predict narrative outcomes effectively.

Human-Interpretable Evidence:

In some embodiments of the present invention, this framework provides human-interpretable evidence for model predictions, thereby improving the transparency and explainability of the reasoning process. This feature is crucial for building trust in AI systems, especially in applications that require clear justification for decisions made by the model.

In other words, in some embodiments of the invention, a system and method include EvenGround are provided, these relate to a method and system for grounding free-text to event-centric KG for the purpose of narrative reasoning. These system and method address the challenges of leveraging structured world knowledge in NLP tasks, particularly in the domain of narrative understanding and prediction.

One of the objectives of this invention is to provide a comprehensive framework that can effectively ground events from free-form text to event-centric knowledge graphs, thereby enhancing the reasoning capabilities of natural language processing systems. In some embodiments of the present invention. EvenGround aims to overcome two critical problems in this field: the event representation problem and the event sparsity problem.

A key feature of this invention is its ability to handle free-text input, which distinguishes it from previous approaches that were limited to specific structured formats. The EvenGround method in some embodiments of the present invention incorporates novel techniques for event extraction, normalization, and multi-level abstraction, which collectively address the challenges of representing events from unstructured text and mitigating the sparsity of events in natural language.

Another significant feature of this invention is its use of the GNN for reasoning over the constructed joint knowledge-enhanced subgraph. This approach allows for the integration of contextual information from the input text with relevant background knowledge from the event-centric knowledge graph, enabling more sophisticated and accurate narrative reasoning.

In the following description, AI-based event grounding systems and event grounding methods of the present invention will be explained with a plurality of systems of multiple embodiments, and the system executes or utilizes the event grounding method present in every embodiment, which will not be described individually in some following embodiments. However, to ordinary skilled person in the art, it is obvious that the following embodiments can be both utilized as a system or a method that are claimed at the end of this document.

In an embodiment of the present invention, an AI-based event grounding system is provided. The event grounding system has an input device, an output device, a GPU, and a processor, and the processor connects the input device, the output device, and the graphic processing unit. For example, the input device may include a keyboard, a mouse, a trackpad, a touch module, a microphone, or any other device that is available for text input in any form, and the output device may include a display, a projector, a speaker, a printer, or any other device that is available for text output in any form. The processor may include a central processing unit (CPU).

For some embodiments of the present invention, the GPU may be a data center GPU designed to accelerate AI, high-performance computing (HPC), data science, and graphics. In some embodiments, the GPU may feature Tensor Cores, which are specialized for deep learning tasks. For example, the GPU may include NVIDIA Tesla V100.

In some other embodiments, the system may include semantic parsing tools. In these embodiments, the semantic parsing tools accurately extract events from free-text inputs. These tools should support semantic role labeling (SRL) to identify verbs and their corresponding arguments within the text.

In some other embodiments, the system may include event normalization module. The event normalization module reduces event sparsity while maintains co-reference information. This module should be capable of detecting and replacing tokens referring to entities with standardized references.

In some other embodiments, the system must implement a GNN-based reasoning model, such as Relational Graph Convolutional Networks (RGCN), to perform reasoning on the joint subgraphs. This model should be capable of leveraging relational information within the KG for effective narrative reasoning.

In systems of some embodiments of the present invention, access to comprehensive event-centric KGs, such as ASER, ATOMIC, or GLUCOSE, is necessary. These KGs should be normalized to ensure compatibility with the event abstraction and grounding processes.

In some other embodiments of the present invention, the system should include Computational Resources. The system requires significant computational resources, including further more high-performance GPUs, to handle the complex tasks of event extraction, normalization, abstraction, and GNN-based reasoning. Adequate memory and processing power are essential for running large-scale experiments and achieving optimal performance.

In some other embodiments, the system should include Natural Language Processing Frameworks. Integration with advanced NLP frameworks, such as Huggingface Transformers and Deep Graph Library (DGL), is recommended to facilitate the implementation of language models and graph-based reasoning algorithms.

In other words, in some embodiments of the present invention, a computer system with sufficient processing power and memory is required. The system should be capable of running natural language processing tools, graph processing algorithms, and neural network models. Additionally, access to a large-scale event-centric knowledge graph is necessary for the knowledge retrieval and integration steps of the method.

In an embodiment of the present invention, the event grounding system receives a free-text through the input device, and the processor performs an event grounding to the free-text through the GPU.

FIG. 1 shows an overview of the process of event grounding of the system in this embodiment. Referring to FIG. 1, in the event grounding system of the embodiment, the GPU performs event acquisition from the free-text using semantic parsing and acquires a plurality of verb-centric events (i.e., extraction). After extraction, the GPU performs event abstraction and acquires a plurality of abstract events (i.e., conceptualization). Then, the GPU grounds the abstract events to a plurality of anchor events of an event-centric KG, and reasons a subgraph through a reasoning model (i.e., event linking & subgraph retrieval). Finally, the GPU generates a prediction based on the reasoning and provide the prediction through the processor and the output device (i.e., reasoning).

In this embodiment, the system extracts the events from the free-text properly. By event abstraction, the system improves the efficiency of grounding or linking between the events and the KG, so as to provide a reliable reasoning and prediction of the free-text. This method leverages advanced NLP and graph-based techniques to transform free-text inputs into structured, reasoned outputs by grounding them in event-centric knowledge graphs. Each step is crucial for ensuring accurate event representation, handling sparsity, and enabling effective narrative reasoning.

To be specific, in this embodiment, the method includes event acquisition from the free-text. The method begins by acquiring events from free-text input using semantic parsing techniques. This involves identifying and extracting verb-centric events, where each event is represented by a verb and its associated arguments. The process ensures that a plurality of events is captured accurately from the text.

In some embodiments of the present invention, the event acquisition includes: event extraction, and event normalization. To tackle the event representation problem, the system of this embodiment is equipped with semantic parsing-based event extraction with an event normalization module to separate events from contexts while preserving their arguments' co-reference information.

In these embodiments, event extraction is a fundamental component of NLP that involves identifying and capturing specific events within a given text. This process focuses on recognizing verbs (actions) and their associated arguments (such as subjects, objects, and other relevant entities). Event extraction aims to systematically break down sentences into discrete, meaningful units of information. By isolating these events, the system can better understand the narrative structure and context of the text. This capability is crucial for applications such as information retrieval, text summarization, and narrative reasoning, where understanding the sequence and relationship between events is essential. Effective event extraction enables the automatic identification of key actions and interactions, facilitating deeper insights into the content of the text.

Also, Event normalization is a complementary process to event extraction, aimed at standardizing the representation of identified events. This involves resolving coreferences (e.g., determining that "he" refers to "Tom") and converting synonymous phrases into a consistent format (e.g., "purchase a ticket" and "buy a ticket" both becoming "buy a ticket"). The goal of event normalization is to ensure that different expressions of the same event are treated uniformly, reducing variability and ambiguity in the data. This standardization is vital for integrating extracted events into structured knowledge bases or knowledge graphs, where consistency in representation enhances the accuracy and reliability of data retrieval and reasoning tasks. By normalizing events, the system can better generalize from specific instances, improving its ability to handle diverse and complex narratives with greater coherence and clarity.

To be specific, in these embodiments, the event acquisition includes: the GPU extracts the verb-centric events from the free text. In this step, every verb-centric event includes a trigger verb and a set of arguments, and each of the argument has a semantic role.

In this process of these embodiments, the system utilizes semantic parsing-based methods to extract events from their contexts. For example, for a piece of text s with n sentences, that is: $s=[s_1, s_2, \ldots, s_n]$. The system conducts semantic role labeling (SRL) on the text s to extract a series of verb-centric events (P), and each event ($p_i$) has a trigger verb ($verb^i$) and a set of arguments ($A^i$). That is: $P=\{p_1, p_2, \ldots, p_m\}$, and $p_i=(verb^i, A^i)$.

In these embodiments, every argument in the set has a semantic role. A semantic role (also known as a thematic role) is the underlying relationship that an argument (a noun phrase) has with the main verb in a clause. Semantic roles provide information about how entities involved in an event participate in that event. They help in identifying the function of each argument within the context of the event described by the verb.

Common Semantic Roles: Agent: The entity that performs the action. Example: Tom in "Tom kicked the ball." Patient (or Theme): The entity that undergoes the action or is affected by it. Example: The ball in "Tom kicked ball." Experiencer: The entity that experiences or perceives the event. Example: John in "John felt happy." Instrument: The means by which the action is performed. Example: With a hammer in "She hit the nail with a hammer." Beneficiary (or Benefactive): The entity for whose benefit the action is performed. Example: For Mary in "He baked a cake for Mary." Location: The place where the action occurs. Example: At the park in "They played at the park." Source: The starting point of the action. Example: From New York in "She flew from New York." Goal: The endpoint of the action. Example: To Paris in "He sent the letter to Paris."

The features of the semantic roles in these embodiments includes: Understanding and Disambiguation. Semantic roles help in understanding the meaning of sentences by clarifying the function of each argument. They disambiguate sentences by providing context about the relationships between different elements in the sentence. For example: In the sentence: "John gave Mary a book." wherein their semantic roles show that John (Agent) performed the giving; Mary (Beneficiary) received the book; and a book (Theme) is the item being given.

The features of the semantic roles in these embodiments also includes: information Extraction and Retrieval. In NLP applications, semantic roles are used to extract structured information from unstructured text. This is useful in tasks like information retrieval, question answering, and summarization. For example, extracting events from news articles to identify who did what to whom, when, and where.

The features of the semantic roles in these embodiments also includes: machine learning and AI. In these embodiments, semantic roles may be used in training machine learning models for various NLP tasks. They provide features that help models understand sentence structure and meaning, improving the performance of tasks like translation, sentiment analysis, and text generation. For example: in machine translation, understanding the roles can help translate sentences more accurately by maintaining the relationships between elements.

The features of the semantic roles in these embodiments also includes: knowledge graph construction. When building knowledge graphs, semantic roles help link entities with the correct relationships. This structured representation of knowledge supports better querying and reasoning. For example: Building a knowledge graph of scientific literature where entities like researchers, institutions, and findings are linked with appropriate roles.

In these embodiments, semantic roles are crucial for comprehending the interactions and relationships between different components of a sentence. They enhance the accuracy of various NLP applications by providing a deeper understanding of sentence structure and meaning.

To be specific, in these embodiments, the semantic roles of argument are based on the PropBank annotation guidelines. The semantic roles include: $ARG_0$: Typically represents the agent or doer of the action. This is often the subject of the sentence in active voice constructions. For example, in "John ate an apple," "John" would be $ARG_0$. $ARG_1$: Usually represents the patient or theme of the action. This is often the direct object of the verb or the subject in passive constructions. In "John ate an apple," "apple" would be $ARG_1$.

In these embodiments, the semantic roles further includes: $ARG_2$, $ARG_3$, $ARG_4$. These are used for less common roles that can vary depending on the verb. They often represent: $ARG_2$: Instrument, benefactive, or attribute $ARG_3$: Starting point, benefactive, or attribute $ARG_4$: Ending point In these embodiments, the semantic roles further includes: $ARG_M$. This represents modifier arguments. These provide additional information about the event but are not core to the verb's meaning. Examples include:

| | | | |
|---|---|---|---|
| $ARG_{M-TMP}$: | Temporal | information | (when) |
| $ARG_{M-LOC}$: | Location | information | (where) |
| $ARG_{M-MNR}$: | Manner | information | (how) |
| $ARG_{M-CAU}$: | Cause or reason. | | |

In the context of the EvenGround framework of these embodiments, these semantic roles are important for several reasons:

Event Extraction: The semantic role labeling helps in identifying the core components of an event (who did what to whom, when, where, how, etc.).

Event Normalization: Understanding the roles helps in preserving important information during the normalization process.

Multi-level Abstraction: The framework uses the importance of these roles to decide the order of argument dropping during abstraction. Specifically, it drops arguments in the order: ARGM, then ARG2/3/4, then ARG1, and finally ARG0.

This structured understanding of event arguments allows the system to create more meaningful and hierarchical representations of events, which is crucial for effective grounding to knowledge graphs and subsequent reasoning tasks.

In some embodiments, the event acquisition includes event normalization. The GPU replaces a plurality of first tokens in the verb-centric events with a plurality of second tokens, and every first token refers to a person; and every second token refers to one or more of the first tokens referring to the same person.

For example, in an embodiment of the present invention, three events are extracted from a text:

1. The general had some wine at a party.
2. He felt sleepy.
3. He said goodbye to them.

In these events, "the general" and "he" refer to the same person, while "them" refer to another group of people. During event normalization, the first tokens in this text includes "the general", "he", and "them".

After replacement, the events will become as follow:

1. [P0] had some wine at the party.
2. [P0] felt sleepy.
3. [P0] said goodbye to [P1].

In these events, [P0] and [P1] are second token. [P0] refers to "the general" and "he", and [P1] refers to "them". The normalization in this embodiment helps reduce event sparsity by removing details in the personal words. This increases their probability of being successfully grounded to KGs.

In some embodiments of the present invention, the event abstraction includes: the GPU dropping the arguments of each verb-centric event according to their importance; and acquire the abstract events.

To be specific, the abstraction process is based on the importance of event arguments in semantic role labeling (i.e., semantic role). For instance, $ARG_0$ and $ARG_1$ are the most important as they usually specify the subject and objects. In contrast, the modifier arguments $ARG_M$ express the least information, as it usually defines additional constraints of the predicate, such as when and where the event happens.

In an embodiment, the system drops the arguments with the following order:

1. $ARG_M$:
2. $ARG_2$, $ARG_3$, $ARG_4$:
3. $ARG_1$: and
4. $ARG_0$.

For example, the abstraction of the series of verb-centric events (P) includes a step of generating a new set of abstract events $P_{abs}$ based on the series of events P, where $P_{abs}=\{q_1, q_2, \ldots, q_m\}$. Each $q_i$ is a sequence of abstract events corresponded to the event $p_i$.

For example, a sequence q includes abstract events $q^0$, $q^1$, $q^2$, and $q^3$, where $q^0=\{ARG_0$: $[P_0]$, V: evacuated, $ARG_2$: to a relative's house, $ARG_M$: last night$\}$; $q^1=\{ARG_0$: $[P_0]$, V: evacuated, $ARG_2$: to a relative's house$\}$; $q^2=\{ARG_0$: $[P_0]$, V: evacuated$\}$; $q^3=\{$V: evacuated$\}$.

Each time an argument is dropped, the abstract level of event increases. Meanwhile, events on higher abstract level (e.g. $p^2$, $p^3$) are more likely to have been recorded in KGs, which alleviates the sparsity problem.

In other words, in this embodiment, each time an argument is dropped, a new, more abstract level of the event is created. This results in a sequence of increasingly abstract representation of the original event.

In this embodiment, this process aims to address the sparsity problem in event grounding. More abstract versions of an event are more likely to match entries in the KG, increasing the chances of successful grounding.

The system of the embodiment retains all levels of abstraction, allowing it to use the most appropriate level for matching in the KG.

In this embodiment, this approach balances between preserving event details (in the more specific levels) and increasing the likelihood of finding a match in the KG (in the more abstract levels).

The multi-level event abstraction is a crucial step in EvenGround as it significantly improves the event grounding performance by increasing the hit rate in the KG while still maintaining the ability to access more detailed event information when needed.

In this embodiment, the method includes event abstraction. After extracting the verb-centric events, the method performs event abstraction to create a plurality of abstract events. This step involves conceptualizing the verb-centric events by reducing them to more general forms, omitting specific details while preserving the core semantic information. This abstraction process helps in handling the sparsity of events and enhances generalization.

Table 1 shows an effect of event extraction, normalization and abstraction. The mean and standard deviation of accuracies on SCT-v1.0 are reported, where "RB" and "BB" refer to RoBERTa-base and BERT-base versions.

TABLE 1

| | EvenGround-$_{RB}$ | EvenGround-$_{BB}$ |
|---|---|---|
| w/o know. | 92.75 ± 0.24 | 83.63 ± 1.16 |
| w/o extract. | 91.86 ± 0.21 | 83.74 ± 0.38 |
| w/o norm. | 92.43 ± 0.46 | 83.98 ± 0.87 |
| w/o abstract. | 92.81 ± 0.32 | 83.88 ± 1.40 |
| ARGM | 93.17 ± 0.25 | 84.79 ± 1.37 |
| ARG2,3,4 | 93.03 ± 0.49 | 84.53 ± 0.60 |
| ARG1 | 93.30 ± 0.11 | 85.78 ± 0.74 |

As shown in Table 1, the systems of the embodiments ablate the event extraction ("w/o extract."), the event normalization ("w/o norm.") and the multi-granularity event abstraction ("w/o abstract." and "-ARGX") respectively. Specifically, when ablating the event extraction module, we instead use the whole sentence for event grounding. When ablating the event normalization part, we skip the normalization step, and use the raw events for grounding. For multi-level event abstraction, we drop event arguments in the order where the highest level ("-ARG1") contains all the abstract events in the previous levels. The base line ("w/o know.") shows the results of vanilla language models, which do not leverage any external knowledge.

In this embodiment, the event extraction and normalization steps are necessary. When removed, the performance relative to the baseline does not improve, or even drops. Also, the event abstraction step is crucial. By only taking the first level of abstraction (removing modifier arguments), we have seen considerable performance gain. The model reaches its best performance after dropping ARG1.

Figure 5:
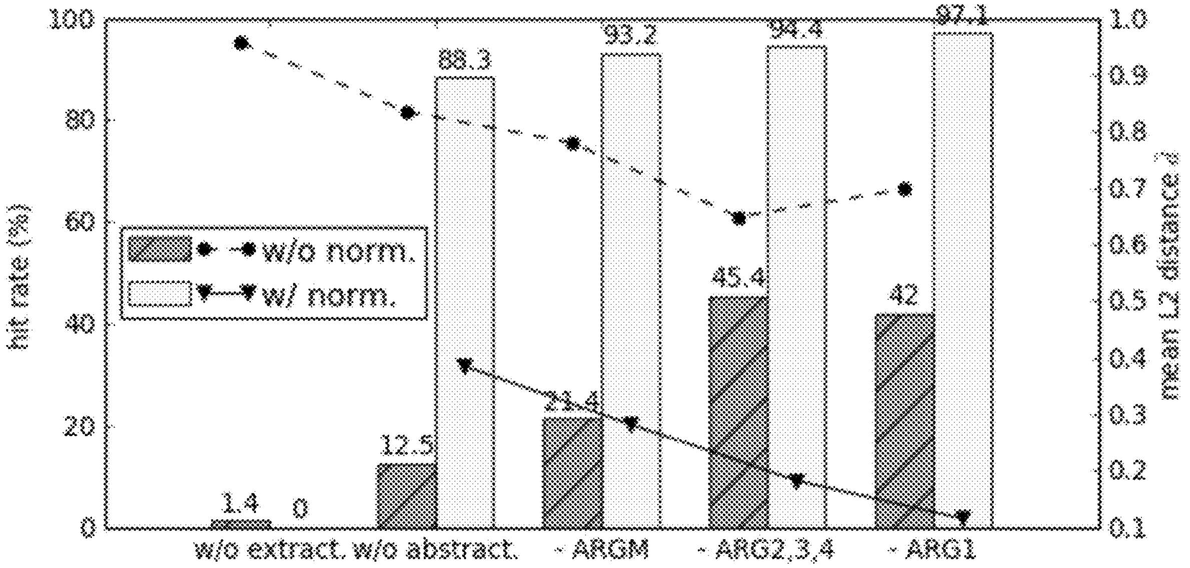
FIG. 5 is a comparison on the event grounding performance under different setting relates to some embodiments of the present invention. The bar plot (with y-axis on the left) show the percentage hit rate of event matching. The lines show the average L2 distance d. We do not conduct normalization for "w/o extract"
Figure 6:
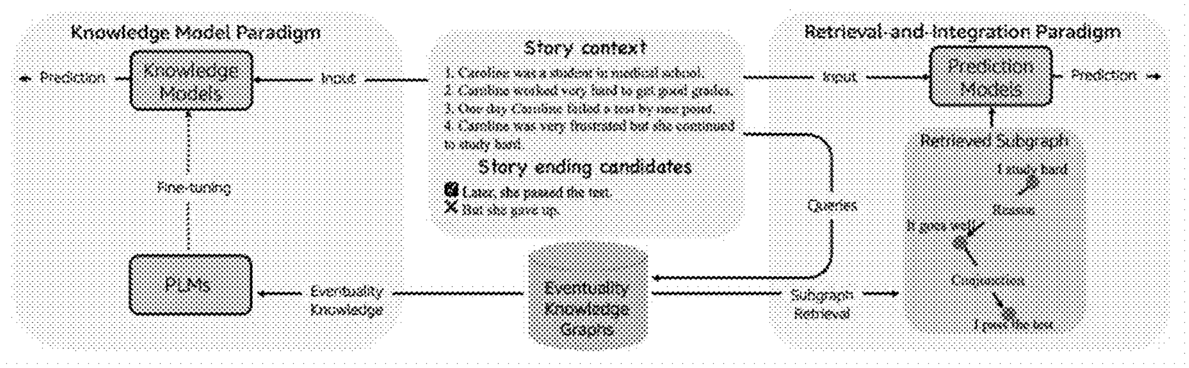
FIG. 6 is an overview of the knowledge model paradigm (left) and the retrieval-and-integration paradigm (right). The knowledge model paradigm pretrains LMs with specially designed objectives, and then further finetunes them to adapt to downstream tasks for prediction. The retrieval-and-integration paradigm retrieves relevant subgraphs of the story context and then makes predictions according to the retrieved subgraphs.

On the other hand, referring to FIG. 5, We analyze by automatic measures: (1) the average L2 distance d in event matching, and (2) the percentage of events considered as successful match, i.e. with L2 distance below l=0.65 (hit rate).

Figure 7:
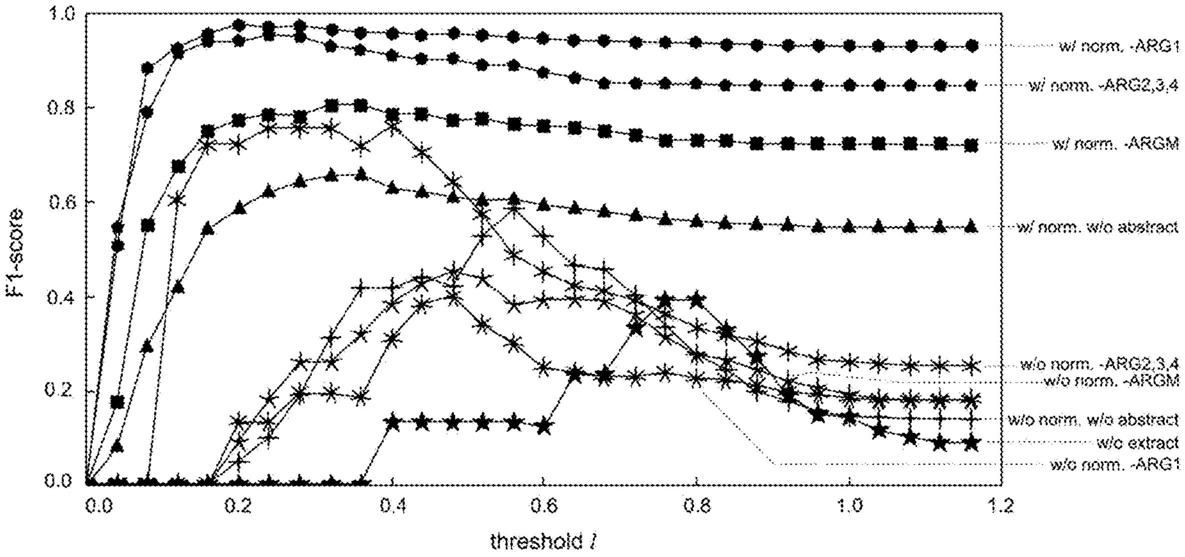
FIG. 7 is a F1-score to threshold curves relates to some embodiments of the present invention. They reflect the event matching performance under different threshold 1.

Referring to Table 2 and FIG. 7, We evaluate the matching results by human annotation. Three domain experts are asked to annotate whether event matching is successful for 50 stories (~500 events) randomly sampled from the validation set of SCT v1.0. The Fleiss's Kappa value is 0.7414. We obtain ground-truth labels by majority vote, and present the accuracy of different event matching methods in Table 2. To investigate the effect of the threshold l used in section 3.2.1, we visualize F1 scores under different threshold values in FIG. 7.

TABLE 2

| | w/o norm. | w/norm. |
|---|---|---|
| w/o extract. | 4.7 | — |
| w/o abstract. | 7.5 | 37.5 |
| ARGM | 10.0 | 56.2 |
| ARG2,3,4 | 14.6 | 73.4 |
| ARG1 | 9.9 | 86.6 |

We can observe that: 1) Directly matching sentences to KGs (w/o extract.) has rather low performance, which necessitates the event extraction stage. 2) The event normalization step drastically improves the matching performance. Removing normalization step can decrease the accuracy by up to 76.7%. 3) In general, the matching performance gradually increases as the abstract level increases. 4) The Pearson's r between automatic and human evaluation results is 0.8977, indicating thresholding on L2 distance is a reasonable way to automatically filter out poorly matched events.

After the abstract events are acquired in this embodiment, the GPU grounds the abstract events. To be specific, in this embodiment, the system grounds the events through GPU. The abstract events are then grounded to a plurality of anchor events within an event-centric knowledge graph (KG). This step involves linking the abstract events to corresponding events or nodes in the KG. The system acquires the anchor events from the nodes, and every abstract event is linked to one of the anchor events, ensuring that the events are properly contextualized within the larger framework of the KG.

In this embodiment, the goal of event matching is to find the most semantically similar node (termed an "anchor event") in the event-centric KG for each extracted and abstracted event. This process involves the following steps:

Step 1: Define the Matching Objective

For each event p in the set of abstracted events $P_{abs}$, we aim to find a node v in the knowledge graph G=(V, E) that minimizes the distance d(p, v). This can be expressed as:

$$v = \underset{v \in V}{\operatorname{argmin}} d(p, v),$$

Where V is the set of nodes in the graph, and d(•, •) denotes the distance between events.

Step 2: Choose a Semantic Similarity Measure

Instead of using token-level similarity measures like TF-IDF or BM25, which can fail to capture the semantic meaning of events, the system of the embodiment opts for a semantic similarity approach. The system uses sentence transformers to encode both the extracted event p and the knowledge graph node v.

Step 3: Compute Semantic Similarity

We compute the semantic similarity using the L2 distance between the encoded representations:

$$d(p, v) = \|SBERT(\text{text}(p)) - SBERT(\text{text}(v))\|_2$$

Where SBERT( ) represents the sentence transformer encoding function, and text( ) retrieves the textual representation of an event.

Step 4: Apply a Matching Threshold

To filter out poor matches, the system empirically sets a threshold 1 on the distance d(p, v). If the distance exceeds this threshold, the match is considered unsuccessful.

Step 5: Collect Matched Anchor Events

For each abstract event in $P_{abs}$, we collect the successfully matched anchor events in the set $C=\{\hat{c}_1, \hat{c}_2, \ldots, \hat{c}_m\}$, where each $\hat{c}_i$ is a sequence of anchor events matched from the corresponding abstracted event sequence $\hat{p}_i$.

Step 6: Handle Unmatched Events

Events that do not find a match within the threshold are not included in the set of anchor events. This helps ensure that only reliably matched events are used in subsequent reasoning steps.

This matching process allows the system to ground the extracted and abstracted events from the input text to the most semantically similar events in the knowledge graph. By using semantic similarity rather than token-level matching, the system can better handle variations in event descriptions and capture the underlying meaning of events. The use of a threshold helps filter out poor matches, improving the quality of the grounded events used in later reasoning stages. The multi-level abstraction from the previous step increases the likelihood of finding good matches, as more abstract event representations are more likely to have counterparts in the knowledge graph.

In this embodiment, after acquiring the anchor event, the GPU acquire the subgraph, and the subgraph includes all the anchor event, the abstract events and the verb-centric events.

To be specific, in this embodiment, the method includes reasoning subgraph creation. The method proceeds to reason over a subgraph by creating a reasoning model. This involves retrieving relevant subgraphs from the KG that are connected to the grounded events. The reasoning subgraph comprises interconnected events and entities, forming a coherent structure for narrative understanding and reasoning.

In the EvenGround framework, starting from $G_{sub}=(V_{sub}, E_{sub})$, the system searches for the shortest path within γ-hops between each event pair in $\{(va, vb); va\in\hat{c}_i; vb\in\hat{c}_j; \hat{c}_i, \hat{c}_j\in C\}$. For any path obtained, the nodes and edges along the path are added to $G_{sub}$. The subgraph $G_{sub}$ serves as a bridge between the input narrative and the vast knowledge stored in the event-centric KG, allowing the system to leverage relevant background knowledge for improved reasoning. The system further constructs a joint knowledge enhanced subgraph $G_{joint}=(V_{joint}, E_{joint})$ for reasoning. $G_{joint}$ includes all the nodes and edges in $G_{sub}$. In addition, we add the context events in P as nodes to $G_{joint}$, where their grounding relation to anchor events in C as well as the context relation are added as edges.

This subgraph $G_{joint}$ plays a crucial role in the EvenGround framework by providing a focused, relevant, and structured representation of the background knowledge needed for effective narrative reasoning.

To be specific, the features of the subgraph includes:

Relevance: The subgraph contains events and relationships that are most pertinent to the input narrative, filtered from the larger knowledge graph.

Compactness: It is a much smaller and more manageable structure compared to the full KG, focusing computational resources on the most relevant information.

Connectivity: The subgraph preserves the connections between events, maintaining the relational information crucial for reasoning.

Path-based: It is constructed by finding shortest paths between matched anchor events, ensuring logical connections between relevant events.

Bounded size: The subgraph retrieval is limited to paths within γ-hops, controlling the size and complexity of the retrieved information.

Rich in context: It captures not just individual events but also the surrounding context from the knowledge graph, providing a richer basis for reasoning.

Interpretability: The subgraph structure allows for more interpretable reasoning processes, as the system can trace its inferences through the graph.

Flexibility: The subgraph can accommodate different levels of event abstraction, from specific to more general representations.

Integration with input: It forms the basis for the joint subgraph ($G_{joint}$) when combined with the context events from the input text.

Reasoning foundation: The subgraph serves as the primary knowledge structure over which the graph neural network performs its reasoning operations.

In this embodiment, after the subgraph is acquired, the GPU employs a GNN module to perform reasoning on the subgraph. To be specific, the embodiment employs a GNN based reasoning model to process the joint knowledge-enhanced subgraph and generate predictions for narrative reasoning tasks. This model operates as follows:

Firstly, the system encodes both the input text s and each node v in the joint subgraph $V_{joint}$ using a language model representation:

$$v = f_{LM}(\text{text}(v)),\ s = f_{LM}(s)$$

where $f_{LM}$ denotes the language model function, and text(v) retrieves the textual content of node v.

Subsequently, the system applies a GNN module to perform reasoning on the joint subgraph $G_{joint}$. In this embodiment, the system utilizes a Relational Graph Convolutional Network (RGCN) to effectively model the relational information within $G_{joint}$. The RGCN updates the representation of each node i in $V_{joint}$ for each layer 1 in an L-layer GNN according to the following equation:

$$h_i^{(l+1)} = \sigma\left(\sum\nolimits_{r\in R}\sum\nolimits_{j\in N_r(i)}\frac{1}{|N_r(i)|}W_r\cdot h_j^{(l)}\right)$$

where:

R represents the set of edge types in $E_{joint}$;

$N_r(i)$ denotes the neighborhood with relation r of node I;

$\sigma(\bullet)$ is a non-linear activation function;

$W_r$ is a learnable weight matrix for each relation type r;

After L layers of updates, the system obtains a vector representation for $G_{joint}$ by pooling the hidden node embeddings from the final layer:

$$g = \text{Pooling}(\{h_i^L : i \in V_{joint}\})$$

Finally, the system generates the prediction probability using a multi-layer perceptron (MLP) module:

$$p(s) \propto MLP(s + g)$$

where s represents the encoded input text and g represents the pooled graph representation.

This GNN-based reasoning model enables the system to effectively integrate information from both the input text and the knowledge graph, capturing complex relationships between events and facilitating sophisticated narrative reasoning. The use of a relational GNN architecture allows the model to leverage the rich structural information present in the event-centric knowledge graph, thereby enhancing its reasoning capabilities.

The model's ability to process both textual and graph-structured inputs in a unified framework represents a significant advancement in narrative understanding and prediction tasks. By combining these diverse information sources, the system can make more informed and contextually relevant predictions, leading to improved performance on a wide range of narrative reasoning benchmarks.

To be specific, in this embodiment, the method includes prediction generation. Finally, the method generates a prediction based on the reasoning performed over the subgraph. This involves using a reasoning model, such as a GNN, to analyze the subgraph and make informed predictions. The results are then processed and provided through an output device, completing the reasoning cycle.

In an embodiment, the output prediction can be served as a story completion. For example, the input free-text shows "Caroline was a student in medical school. Caroline worked hard to get good grades.", and the prediction may be "She did very well".

Figure 2:
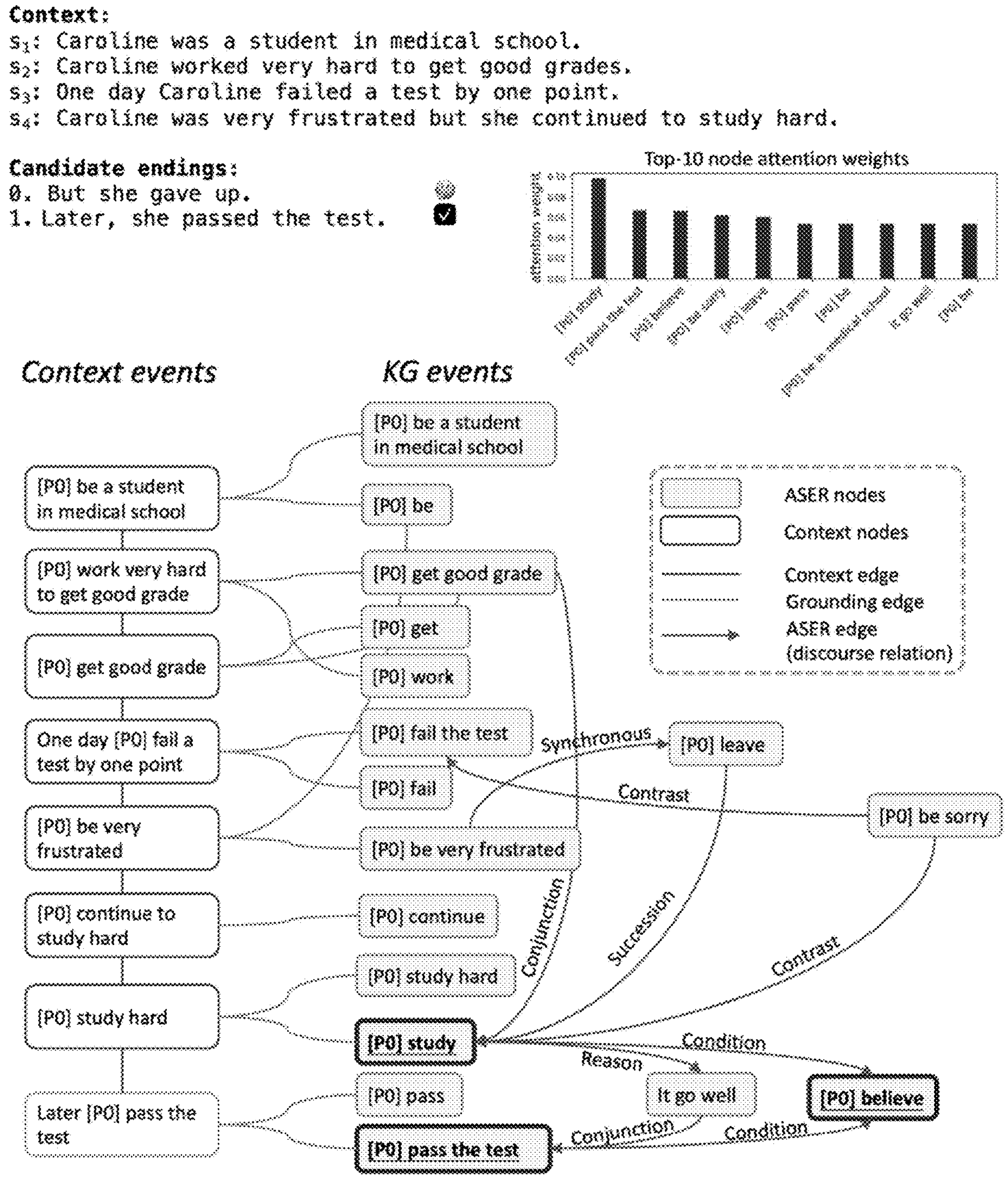
FIG. 2 is an overview of a subgraph of an embodiment of the present invention, and the subgraph is from SCT-v1.0 dataset. The top-10 nodes attention weights are shown in the barplot. The top-3 nodes are bolded and underlained.

Referring to FIG. 2, in another embodiment, for example, the input free-text shows "Caroline was a student in medical school. Caroline worked very hard to get good grades. One day Caroline hailed a test by one point. Caroline was very frustrated but she continued to study hard.", and the prediction may be "Later, she passed the test".

Figure 3:
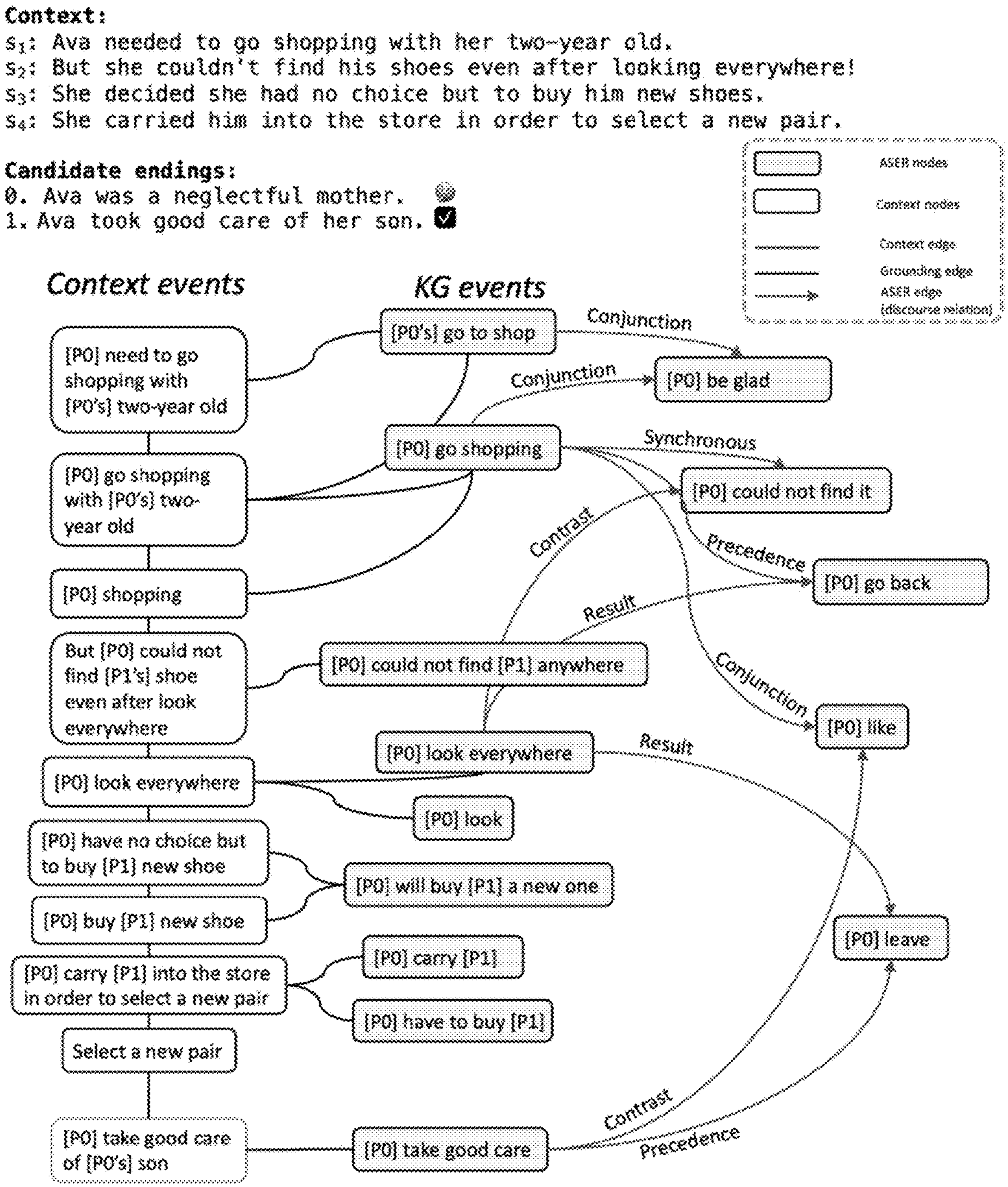
FIG. 3 is another overview of a subgraph of an embodiment of the present invention. The top-10 nodes attention weights are shown in the barplot. The top-3 nodes are bolded and underlained.

Referring to FIG. 3, in another embodiment, for example, the input free-text shows "Ava needed to go shopping with her two-year old. But she couldn't find his shoes even after looking everywhere! She decided she had no choice but to buy him new shoes. She carried him into the store in order to select a new pair.", and the prediction may be "Ava took good care of her son.".

Figure 4:
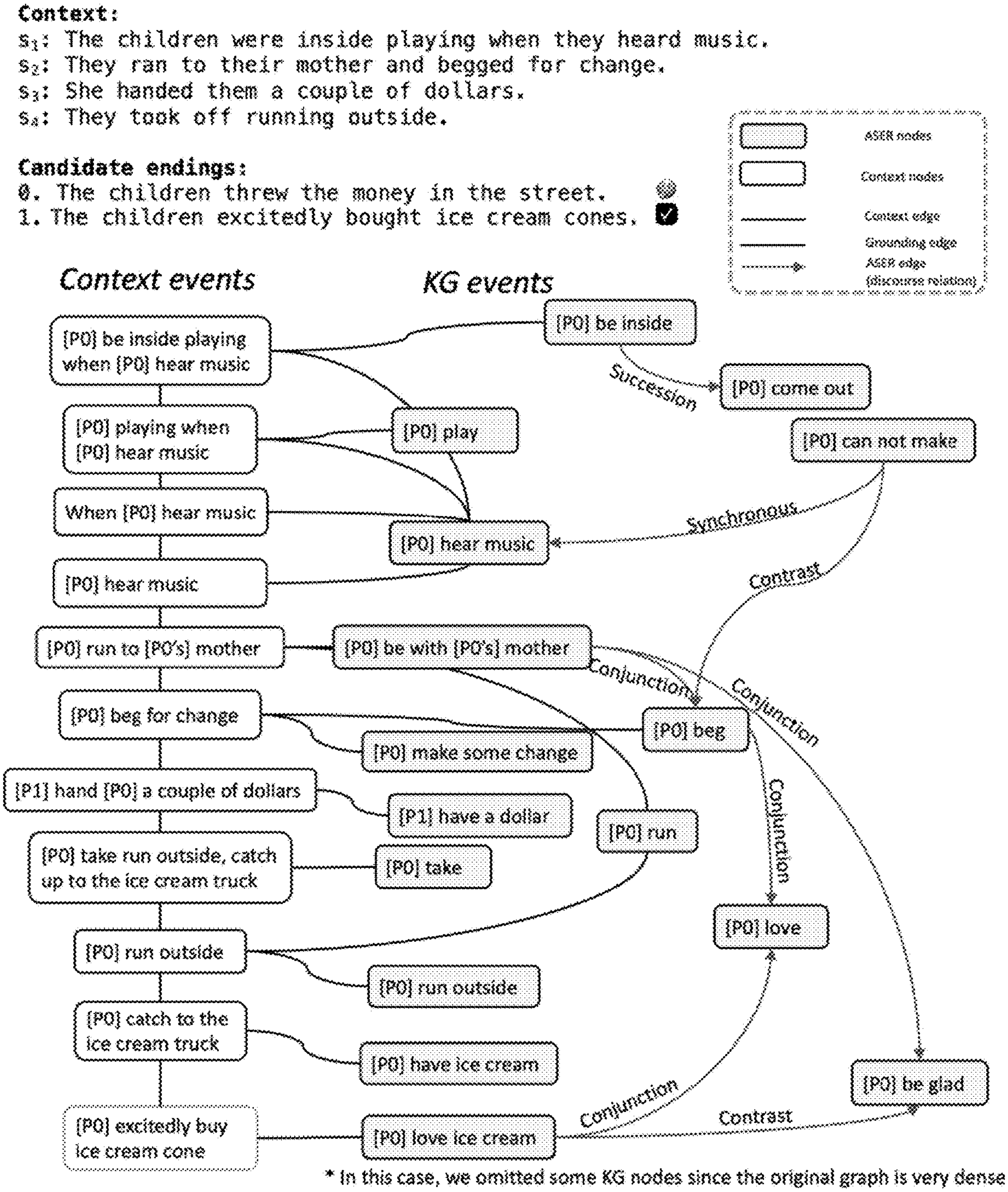
FIG. 4 is another overview of a subgraph of an embodiment of the present invention. The top-10 nodes attention weights are shown in the barplot. The top-3 nodes are bolded and underlained.

Referring to FIG. 4, in another embodiment, for example, the input free-text shows "The children were inside playing when they heard music. They ran to their mother and begged for change. She handed them a couple of dollars. They took off running outside.", and the prediction may be "The children excitedly bought ice cream cones.".

In another embodiment, for example, the input free-text shows "After finishing his work, Tom decided to relax. He went to the cinema and bought a ticket for a movie.", and the prediction may be "Tom will enjoy watching the movie and feel more relaxed afterward.".

In another embodiment, the output prediction can be served as a next event prediction in healthcare. For example, the input free-text shows "Patient A was diagnosed with high blood pressure. The doctor prescribed medication and recommended lifestyle changes.", and the prediction may be "The patient will likely have a follow-up appointment in three months to monitor the effectiveness of the medication and lifestyle changes.".

In another embodiment, the output prediction can be served as a customer support automation. For example, the input free-text shows "A customer reported that their internet connection is down. They reset the router, but the issue persists.", and the prediction may be "The next step for the customer is to contact technical support for further troubleshooting or schedule a technician visit.".

In another embodiment, the output prediction can be served as a financial news analysis. For example, the input free-text shows "Company X announced a significant drop in quarterly earnings due to decreased sales in their primary market.", and the prediction may be "The company's stock price is likely to decline in the next trading session as investors react to the earnings report.".

In another embodiment, the output prediction can be served as a personal assistant scheduling. For example, the input free-text shows "John has a meeting with his project team at 10 AM. He needs to prepare the presentation beforehand.", and the prediction may be "John should start preparing his presentation at 8 AM to ensure he is ready for the 10 AM meeting.".

In some embodiments of the present invention, all the words in the events are lemmatized.

In the event extraction and representation process of the present invention, all words within the extracted events undergo lemmatization. Lemmatization is a crucial preprocessing step that reduces inflected forms of words to their base or dictionary form, known as the lemma. This process helps to standardize the representation of words across different events, reducing variability and improving the system's ability to match semantically similar events. For instance, verbs in different tenses (e.g., "running," "ran," "runs") are all reduced to their base form ("run"), while plural nouns are converted to their singular form.

The lemmatization process significantly contributes to addressing the event sparsity problem. By normalizing word forms, it increases the likelihood of finding matches between extracted events and events stored in the knowledge graph. This standardization is particularly beneficial when performing event abstraction and matching, as it allows the system to recognize and group semantically equivalent events that may be expressed using different inflected forms in the original text.

In some embodiment of the present invention, while processing the first and second tokens, a plurality of spans of words are detected by syntactic parsing and animacy classification, and the event grounding system employ the co-reference information between these spans to normalize all spans that refer to persons and generate the second tokens.

The event grounding system employs sophisticated natural language processing techniques to handle multi-word expressions and entity references within events. Specifically, the system utilizes syntactic parsing to identify grammatical structures and word dependencies within the text. In parallel, it applies animacy classification to determine which word spans likely refer to animate entities, particularly persons. These processes allow the system to detect and isolate meaningful multi-word spans that represent coherent concepts or entities within the events.

Once these spans are identified, the system leverages co-reference information to track references to the same entities across different events or sentences. This co-reference resolution enables the system to normalize all spans that refer to persons, replacing them with standardized tokens (e.g., "[P0]", "[P1]"). This normalization process is crucial for maintaining consistency in event representations and facilitating more accurate event matching and reasoning. By abstracting away specific entity names while preserving their roles and relationships within events, the system can more effectively ground events to the knowledge graph and reason about narrative structures independently of specific character identities.

The functional units and modules of the system in accordance with the embodiments disclosed herein may be implemented using computing devices, computer processors, or electronic circuitries including but not limited to application specific integrated circuits (ASIC), field programmable gate arrays (FPGA), microcontrollers, and other programmable logic devices configured or programmed according to the teachings of the present disclosure. Computer instructions or software codes running in the computing devices, computer processors, or programmable logic devices can readily be prepared by practitioners skilled in the software or electronic art based on the teachings of the present disclosure.

All or portions of the methods in accordance to the embodiments may be executed in one or more computing devices including server computers, personal computers, laptop computers, mobile computing devices such as smartphones and tablet computers.

The embodiments may include computer storage media, transient and non-transient memory devices having computer instructions or software codes stored therein, which can be used to program or configure the computing devices, computer processors, or electronic circuitries to perform any of the processes of the present invention. The storage media, transient and non-transient memory devices can include, but are not limited to, floppy disks, optical discs, Blu-ray Disc, DVD, CD-ROMs, and magneto-optical disks, ROMs, RAMs, flash memory devices, or any type of media or devices suitable for storing instructions, codes, and/or data.

Each of the functional units and modules in accordance with various embodiments also may be implemented in distributed computing environments and/or Cloud computing environments, wherein the whole or portions of machine instructions are executed in distributed fashion by one or more processing devices interconnected by a communication network, such as an intranet, Wide Area Network (WAN), Local Area Network (LAN), the Internet, and other forms of data transmission medium.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated.

What is claimed is:

1. A machine learning-based natural language processing (NLP) method performed by an NLP system including at least one processor, a graphics processing unit (GPU) coupled to the at least one processor, an input device, an output device, and a memory storing a structured event-centric Knowledge Graph (KG), the method comprising:

receiving, by the at least one processor through the input device, an input free-text;

performing, by the GPU, semantic role labeling on the input free-text to generate a plurality of verb-centric event records, each verb-centric event record including a trigger verb and a plurality of arguments respectively labeled with semantic roles;

normalizing, by the GPU, the plurality of verb-centric event records;

for each verb-centric event record, generating, by the GPU, a corresponding sequence of abstract event records at different abstraction levels by iteratively removing arguments from the verb-centric event record according to a predefined importance order of the arguments while retaining the different abstraction levels in the corresponding sequence;

retrieving, by the at least one processor, the structured event-centric KG from the memory;

for each abstract event record in each corresponding sequence, matching, by the GPU, the abstract event to a plurality of anchor events in the retrieved event-centric KG;

extracting, by the GPU, from the event-centric KG, a basic subgraph including the matched anchor events;

constructing, by the GPU, a joint knowledge-enhanced subgraph based on the basic subgraph, wherein the joint knowledge-enhanced subgraph includes context event nodes corresponding to the plurality of verb-centric event records, abstract event nodes corresponding to the corresponding sequences of abstract event records, grounding-relation edges connecting the abstract event nodes to the selected anchor events, and context-relation edges representing an order of the context event nodes;

performing, by the GPU, reasoning on the joint knowledge-enhanced subgraph using a relational graph convolutional network that updates node embeddings according to edge types and pools updated node embeddings to generate a graph representation;

generating, by the GPU, one or more outcome predictions of events using a multi-layer perceptron based on an encoded representation of the input free-text and the graph representation; and outputting, by the at least one processor through the output device, the one or more outcome predictions of events;

wherein the joint knowledge-enhanced subgraph includes the plurality of verb-centric event records, the corresponding sequences of abstract event records, and the selected anchor events.

2. The machine learning-based natural language processing (NLP) method of claim 1, wherein the plurality of verb-centric event records is normalized by:

detecting a plurality of original person-referring tokens using syntactic parsing and animacy classification;

resolving co-reference information among the plurality of original person-referring tokens; and replacing the plurality of original person-referring tokens with normalized person-referring tokens so that different original person-referring tokens referring to a same person are replaced with a same normalized person-referring token.

3. The machine learning-based natural language processing (NLP) method of claim 1, wherein the abstract event is matched to a plurality of anchor events in the event-centric KG by:

encoding, using a transformer, a textual representation of the abstract event record and textual representations of candidate nodes in the event-centric KG;

computing L2 distances between encoded textual representations; and selecting a candidate node as an anchor event only when a corresponding L2 distance satisfies a predetermined distance threshold, and excluding candidate nodes having corresponding L2 distances that fail to satisfy the predetermined distance threshold.

4. The machine learning-based natural language processing (NLP) method of claim 1, wherein the joint knowledge-enhanced subgraph is constructed by:

searching shortest paths, each within a predetermined hop limit, between pairs of anchor events in the basic subgraph; and adding, along the shortest paths, the context event nodes, the abstract event nodes, the grounding-relation edges, and the context-relation edges.

5. A machine learning-based natural language processing (NLP) system with enhanced reasoning capability, comprising:

an input device configured to receive an input free-text;

an output device configured to output one or more outcome predictions of events;

a memory configured to store a structured event-centric Knowledge Graph (KG);

at least one processor coupled to the input device, the output device, and the memory; and a graphics processing unit (GPU) coupled to the at least one processor, wherein the at least one processor is configured to receive the input free-text through the input device, wherein the GPU is configured to perform semantic role labeling on the input free-text to generate a plurality of verb-centric event records, each verb-centric event record including a trigger verb and a plurality of arguments respectively labeled with semantic roles, wherein the GPU is configured to normalize the plurality of verb-centric event records, wherein the GPU is configured to, for each verb-centric event record, generate a corresponding sequence of abstract event records at different abstraction levels by iteratively removing arguments from the verb-centric event record according to a predefined importance order of the arguments while retaining the different abstraction levels in the corresponding sequence, wherein the at least one processor is configured to retrieve the structured event-centric KG from the memory, wherein the GPU is configured to, for each abstract event record in each corresponding sequence, match the abstract event record to a plurality of anchor events in the retrieved event-centric KG, wherein the GPU is configured to extract, from the event-centric KG, a basic subgraph including the matched anchor events, wherein the GPU is configured to construct a joint knowledge-enhanced subgraph based on the basic subgraph, wherein the joint knowledge-enhanced subgraph includes context event nodes corresponding to the plurality of verb-centric event records, abstract event nodes corresponding to the corresponding sequences of abstract event records, grounding-relation edges connecting the abstract event nodes to selected anchor events, and context-relation edges representing an order of the context event nodes, wherein the GPU is configured to perform reasoning on the joint knowledge-enhanced subgraph using a relational graph convolutional network configured to update node embeddings according to edge types and pool updated node embeddings to generate a graph representation, wherein the GPU is configured to generate the one or more outcome predictions of events using a multi-layer perceptron based on an encoded representation of the input free-text and the graph representation, wherein the at least one processor is configured to output the one or more outcome predictions of events through the output device, and wherein the joint knowledge-enhanced subgraph includes the plurality of verb-centric event records, the corresponding sequences of abstract event records, and the selected anchor events.

6. The machine learning-based NLP system of claim 5, wherein the GPU is configured to normalize the plurality of verb-centric event records by:

detecting a plurality of original person-referring tokens using syntactic parsing and animacy classification;

resolving co-reference information among the plurality of original person-referring tokens; and replacing the plurality of original person-referring tokens with normalized person-referring tokens so that different original person-referring tokens referring to a same person are replaced with a same normalized person-referring token.

7. The machine learning-based NLP system of claim 5, wherein the GPU is configured to match the abstract event record to the plurality of anchor events in the event-centric KG by:

encoding, using a transformer, a textual representation of the abstract event record and textual representations of candidate nodes in the event-centric KG;

computing L2 distances between encoded textual representations; and selecting a candidate node as an anchor event only when a corresponding L2 distance satisfies a predetermined distance threshold, and excluding candidate nodes having corresponding L2 distances that fail to satisfy the predetermined distance threshold.

8. The machine learning-based NLP system of claim 5, wherein the GPU is configured to construct the joint knowledge-enhanced subgraph by:

searching shortest paths, each within a predetermined hop limit, between pairs of anchor events in the basic subgraph; and adding, along the shortest paths, the context event nodes, the abstract event nodes, the grounding-relation edges, and the context-relation edges.

* * * * *